United States Patent [19]
Lafe

[11] Patent Number: 5,677,956
[45] Date of Patent: Oct. 14, 1997

[54] METHOD AND APPARATUS FOR DATA ENCRYPTION/DECRYPTION USING CELLULAR AUTOMATA TRANSFORM

[76] Inventor: Olurinde E. Lafe, P.O. Box 700, Chesterland, Ohio 44026

[21] Appl. No.: 537,080

[22] Filed: Sep. 29, 1995

[51] Int. Cl.$^6$ ............... H04K 1/00; H04L 9/00
[52] U.S. Cl. ................... 380/28; 380/9
[58] Field of Search ............. 380/9, 28, 46; 364/717

[56] References Cited

U.S. PATENT DOCUMENTS

| | | | |
|---|---|---|---|
| 4,691,291 | 9/1987 | Wolfram | 364/717 |
| 4,723,284 | 2/1988 | Munck et al. | 380/25 |
| 4,961,159 | 10/1990 | McLeod et al. | 364/717 |
| 4,979,832 | 12/1990 | Ritter | 380/28 |
| 5,003,597 | 3/1991 | Merkle | 380/37 |
| 5,038,386 | 8/1991 | Li | 382/302 |
| 5,048,086 | 9/1991 | Bianco et al. | 380/28 |
| 5,142,577 | 8/1992 | Pastor | 380/21 |
| 5,159,690 | 10/1992 | Margolus et al. | 395/800 |
| 5,317,639 | 5/1994 | Mittenthal | 380/37 |
| 5,365,589 | 11/1994 | Gutowitz | 380/43 |
| 5,412,729 | 5/1995 | Liu | 380/28 |

FOREIGN PATENT DOCUMENTS

A 0257 581  3/1988  European Pat. Off. ........ G06F 15/06

OTHER PUBLICATIONS

Emergent Innovations on Information Transfer Processing and Decision Making, Chicago, Oct. 18-21, 1992, vol. 2 of 2, Oct. 18, 1992, Institute of Electrical and Electronics Engineers, pp. 1663-1669, XP000379009. Ying Liu: "Fractals, Neural Networks, Cellular Automata, Formal Lanauge and Coding Theory", p. 1163, lines 1 and 61, p. 1167, line 34 and p. 1168, line 50.

PCT International Search Report.

*Primary Examiner*—Thomas H. Tarcza
*Assistant Examiner*—Pinchus M. Laufer
*Attorney, Agent, or Firm*—Finnegan, Henderson, Farabow, Garrett & Dunner, LLP

[57] ABSTRACT

A method and apparatus for encrypting and decrypting data using a transform which is a function of input data and a basis. After the input data is received, the basis is generated from key values specifying characteristics of a cellular automata space of at least one cell and at least one rule of interaction for the at least one cell. Using the generated basis, the input data is transformed into encrypted or decrypted data.

23 Claims, 10 Drawing Sheets

| k \ i | 0 | 1 | 2 | 3 | |
|---|---|---|---|---|---|
| 0 | 1 | 0 | 1 | 0 | |
| 1 | 0 | 0 | 1 | 0 | CA STATE, $a_{ik}$ |
| 2 | 0 | 1 | 1 | 0 | |
| 3 | 0 | 1 | 0 | 1 | |

| k \ i | 0 | 1 | 2 | 3 | |
|---|---|---|---|---|---|
| 0 | 1 | -1 | 1 | -1 | |
| 1 | -1 | -1 | 1 | -1 | |
| 2 | -1 | 1 | 1 | -1 | TYPE 1 BASIS, $A_{ik}$ |
| 3 | -1 | 1 | -1 | 1 | |

| k \ i | 0 | 1 | 2 | 3 | |
|---|---|---|---|---|---|
| 0 | 1 | -1 | -1 | -1 | |
| 1 | -1 | -1 | 1 | -1 | |
| 2 | -1 | 1 | 1 | -1 | TYPE 2 BASIS, $A_{ik}$ |
| 3 | -1 | -1 | -1 | 1 | |

| k \ i | 0 | 1 | 2 | 3 | |
|---|---|---|---|---|---|
| 0 | 0.25 | 0 | 0.25 | 1 | |
| 1 | 0 | 0.25 | 0.5 | 0.5 | TYPE 3 BASIS, $A_{ik}$ |
| 2 | 0.25 | 0.5 | 1 | 0 | WITH Nw=1 |
| 3 | 1 | 0.5 | 0 | 0.25 | |

| k \ i | 0 | 1 | 2 | 3 | |
|---|---|---|---|---|---|
| 0 | 1 | 0 | -1 | 2 | |
| 1 | 0 | 4 | -2 | 0 | |
| 2 | -1 | -2 | 9 | -6 | TYPE 4 BASIS, $A_{ik}$ |
| 3 | 2 | 0 | -6 | 4 | |

| k \ i | 0 | 1 | 2 | 3 | |
|---|---|---|---|---|---|
| 0 | 1 | 0 | -1 | 0 | |
| 1 | 0 | 0 | 0 | 0 | TYPE 5 BASIS, $A_{ik}$ |
| 2 | 0 | 0 | 1 | 0 | Lw=2 |
| 3 | 0 | 0 | 0 | 0 | |

| k \ i | 0 | 1 | 2 | 3 | |
|---|---|---|---|---|---|
| 0 | 0.25 | 0 | 0.25 | 0 | |
| 1 | 0 | 0 | 0.75 | 0 | |
| 2 | 0.25 | 0.75 | 4.0 | 0 | TYPE 6 BASIS, $A_{ik}$ |
| 3 | 0 | 0 | 0 | 0.25 | |

| k \ i | 0 | 1 | 2 | 3 | |
|---|---|---|---|---|---|
| 0 | 1 | 0 | -1 | 2 | TYPE 7 BASIS, $A_{ik}$ |
| 1 | 0 | 4 | -2 | 0 | WINDOWED TYPE 4 |
| 2 | 0 | 0 | 9 | -6 | Nw=2 |
| 3 | 0 | 0 | 0 | 4 | |

EXAMPLES OF CA BASIS TYPES

METHOD AND APPARATUS FOR DATA ENCRYPTION/DECRYPTION USING CELLULAR AUTOMATA TRANSFORM

BACKGROUND OF THE INVENTION

The present invention relates to data encryption/decryption, and, in particular, to applying a cellular automata transform to data encryption/decryption.

DESCRIPTION OF RELATED ART

Data is encrypted, that is, scrambled, for security during transmission or storage. Several encryption techniques using dynamic systems have been developed in recent years.

For example, in U.S. Pat. No. 5,048,086, M. Blanco and D. Reed taught a system that uses dynamic systems to generate pseudo-random numbers which are combined, in an XOR operation, with the plain text to form the encrypted message. The seed of the pseudo-random number is the encryption key.

S. Wolfram taught the use of a particular cellular automaton, known as Rule 30, to generate pseudo-random numbers. Proceedings of Crypto '85, pp 429–432. The encryption key is only the initial state of the cellular automaton. Additionally, P. Guan taught the use of an invertible dynamical system for encryption. "Cellular Automata Public-Key Cryptosystems," *Complex Systems* 1, 1987. During the encryption phase the dynamical system is run in the forward direction. Decryption involves running the inverse of the dynamical system on the encrypted message.

J. Kari has also described an encryption technique that uses reversible dynamical systems. J–P. Delahaye, "Les Automates," *Pour La Science*, pp 126–134, 1991.

Lastly, H. Gutowitz described a system using irreversible dynamical systems, involving either or both forward and backward iteration, in some aspects of the encryption and decryption process. U.S. Pat. No. 5,365,589.

None of these conventional techniques employs a transform in which input data is encrypted/decrypted using a basis. Further, one primary limitation of these conventional cryptographic techniques is the complexity of the encryption and decryption processes. In the implementations that use pseudo-random numbers, for example, the quality of the generated numbers, as pertaining to their true randomness, cannot by fully guaranteed. The ones that use forward and backward iteration of reversible and irreversible dynamical systems involve complicated arithmetic operations. As will be explained below, the present invention uses a transform that involves a huge library of cryptographic keys derived from a family of cellular automata.

SUMMARY OF INVENTION

To overcome the limitations of the existing technology the present invention applies a cellular automata (CA) transform for data encryption/decryption. In accordance with the disclosed method, a computer receives input data, generates a CA basis from a combination of key values, and transforms the input data into encrypted data using the CA basis.

Decrypting of encrypted data is performed by a computer that receives encrypted data, generates a CA basis from a combination of key values, and transforms the encrypted data using the basis into decrypted data using the CA basis.

It is to be understood that both the foregoing general description and the following detailed description are exemplary and explanatory and are intended to provide further explanation of the invention as claimed.

BRIEF DESCRIPTION OF DRAWINGS

The accompanying drawings are included to provide a further understanding of the invention and are incorporated in and constitute part of this specification. These drawings illustrate several embodiments of the invention and together with the description serve to explain the principles of the invention.

DETAILED DESCRIPTION

Reference will now be made in detail to the present preferred embodiments of the invention, examples of which are illustrated in the accompanying drawings.

Cellular automata (CA) are dynamic systems in which space and time are discrete. The cells, which are arranged in the form of a regular lattice structure, have a finite number of states. These states are updated synchronously according to a specified local rule of interaction. For example, a 2-state 1-dimensional cellular automaton will consist of a set of cells (sites), each of which can take value 0 or 1. Using a specified "rule," the values for all cells are updated simultaneously in discrete time steps. An example of a rule is the expression that the value of each cell at a specific time interval is equal to the sum of the values of its immediately adjacent neighbor cells at the previous time interval. With a k-state automaton, each cell can take any of the integer values between 0 and k-1.

In general, the rule governing the evolution of the cellular automaton will encompass r sites up to a finite distance away. Thus, such a cellular automaton is a k-state, r-site neighborhood CA.

Figure 1:
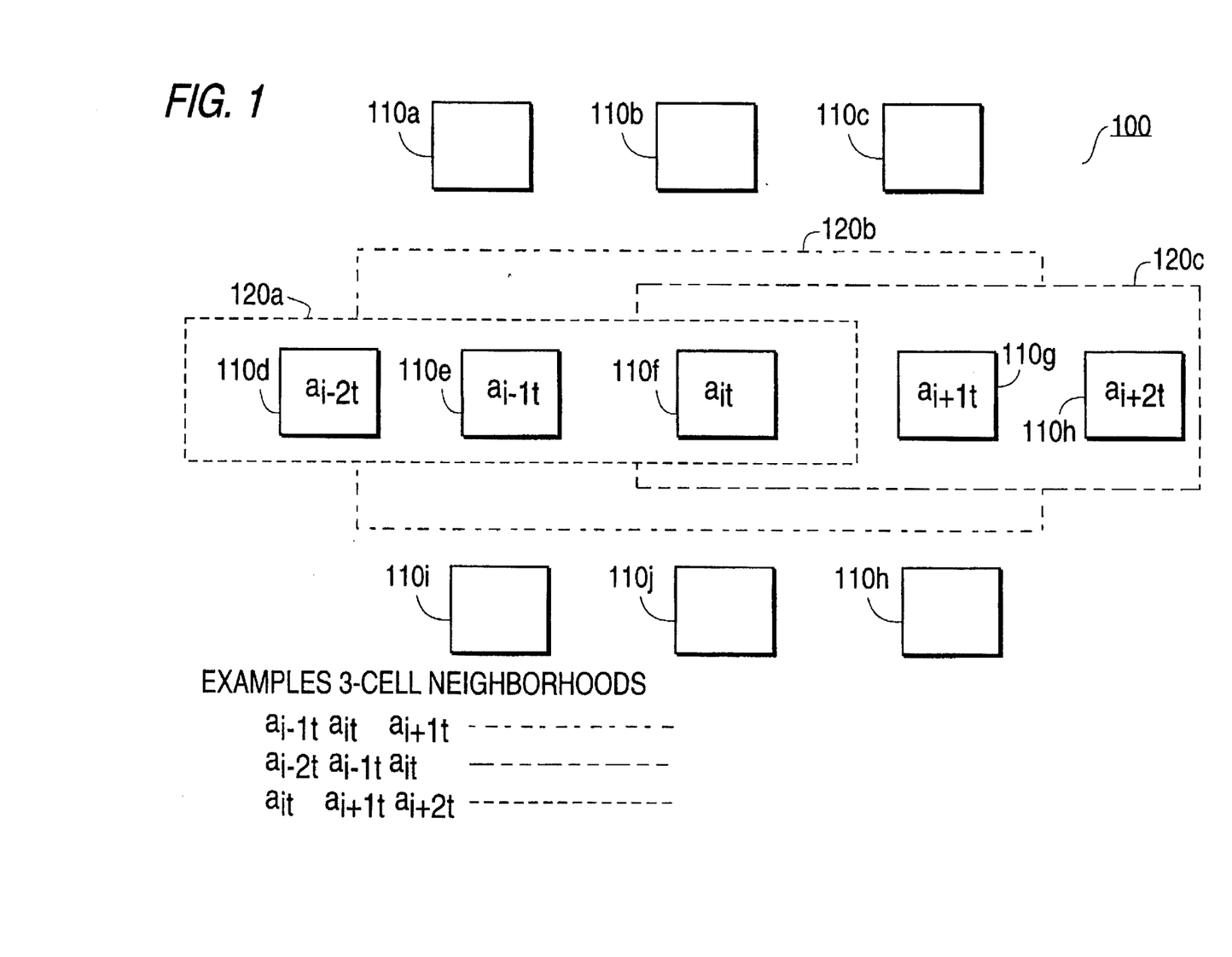
FIG. 1 is an illustration of three-cell neighborhoods in a CA lattice.

A CA-based technology offers a favorable computational environment for encrypting and decrypting data in real time. The greatest advantage is that the underlying computational procedure uses Boolean computation, the natural language of computers, and thus does not devour time and computional resources by performing complicated floating point computations. The computational simplicity translates into extremely fast data processing speed. FIG. 1 illustrates an eleven cell lattice 100 with cells 110a–k some of which are grouped in three exemplary cell "neighborhoods" 120a–c as shown by dashed lines. Each neighborhood 120a–c comprises a one-dimensional CA space. The state of each cell 110a–k is given by the Boolean variable a. When the state is on, a≡1; otherwise it is off and a≡0. The quantity $a_{i,t}$ represents the state (Boolean) of the i-th cell, at discrete time t, and whose two neighbors are in the following states: $a_{i-1,t}$ and $a_{i+1,t}$. One of ordinary skill in the art will readily appreciate that there are many possible lattice configurations and groupings of cell neighborhoods.

In general, the present invention implements a rule that will be used to synchronously calculate the state $a_{i,t+1}$ from the state of the cells in the neighborhood at the t-th time level. The cellular automaton evolution is expressible in equation 1:

$$a_{i,t+1} = \Im(a_{i-1,t}, a_{i,t}, a_{i+1,t}) \tag{1}$$

where $\Im$ is a Boolean function defining the rule.

There are eight possible cell values combinations for each neighborhood in a dual-state 3-site neighborhood automaton. These configurations are:

111 →$C_0$
110 →$C_1$
101 →$C_2$
100 →$C_3$
011 →$C_4$
010 →$C_5$
001 →$C_6$
000 →$C_7$ in which $C_n$ is the Boolean value generated by the rule given the n-th configuration. There are $2^n$ possible configurations for an n-site dual-state automaton.

Each rule for a one dimensional, dual-state, 3-site automaton, for example, the neighborhoods 120a–c, can be described by an eight-digit binary number. When specifying the rule of interaction for a CA, this binary number is used interchangeably with its decimal equivalent. There are, for example, $2^8$ (or 256) possible distinct CA rules in one dimension with a two-state, three-site neighborhood.

Figure 2:
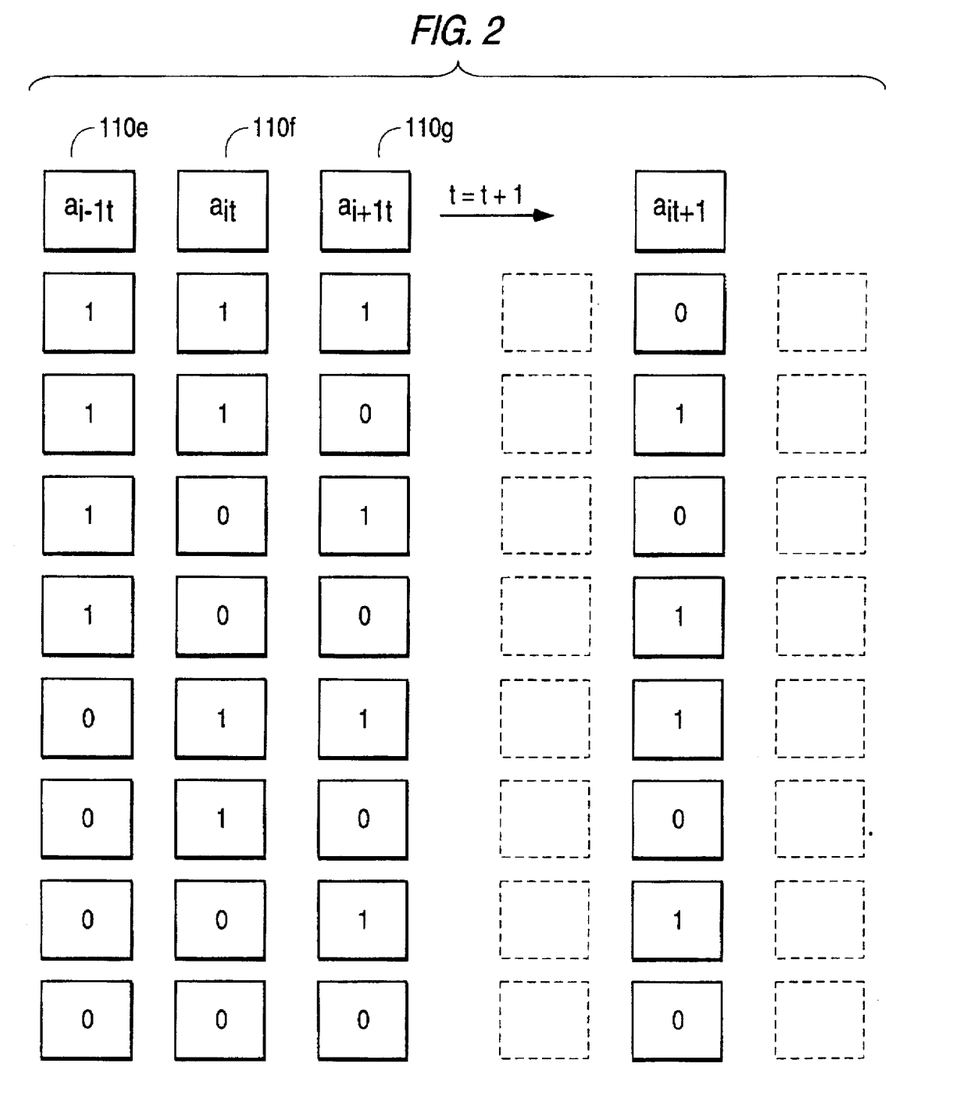
FIG. 2 is an illustration of the application of a local rule of interaction to a three-cell CA neighborhood.

FIG. 2 illustrates application of a rule (to be described below) over one time interval for a one dimensional CA. The variables at each cell may take values 0 or 1. The eight possible states of three adjacent cells are given in the left hand column and constitute the configurations $C_0$–$C_7$ set forth above. The right hand column gives the result of the application of the rule for the time evolution of the CA by giving $a_{i,t}$ the value to be taken by the central cell 110f of the three cells at the next time interval.

If a particular rule is applied to the dual-state three-cell neighborhood value combination listed above, a set of "configurations" $C_0$–$C_7$ result. For example, application of the rule known as the "modulo two" rule, that is, where the value of a cell at a particular time interval is the modulo two sum of the values of its two neighbors at the previous time interval results in the configurations shown in FIG. 2. Those skilled in the art know that this CA rule can be referred to by its Wolfram notation. In Wolfram notation, a CA rule number is assigned based on the decimal equivalent of the binary number $C_0C_1C_2C_3C_4C_5C_6C_7$. For example, rule number 90 is the decimal equivalent of the binary number 01011010.

In general, for a k-state/r-site CA, there are $k^{k^r}$ rules and the evolution is expressible in equation 2:

$$a_{i,t+1} = \Im(a_{i-m,t}, a_{i-m+1,t}, \ldots, a_{i+m,t}) \tag{2}$$

where m=(r−1)/2 (note that equation (2) assumes that r is an odd integer. If there are N cells in the entire one-dimensional CA space, there are a total of $k^N$ possible initial configurations with which to start the evolution of the CA space.

Furthermore, if the CA is run over T discrete time intervals, the number of boundary (at the left and right boundaries) configurations possible is $k^{2T}$.

For certain applications of the present invention, boundary configurations, the assumptions dictating which cells are neighbors of cells at the edge of a CA lattice, are derived from the evolving lattice (cell states change over successive time intervals) by imposing a periodic (cyclic) condition. A cyclic boundary condition means that cells on the left 110d and right edges 120c of a CA lattice are considered neighbors for purposes of the application of the rule of interaction.

Since there are $k^{k^r}$ rules, the number of ways we can evolve a k-state/r-site/N-cells CA over T time steps is of the order $k^{k^r+N+2T}$.

Figure 3:
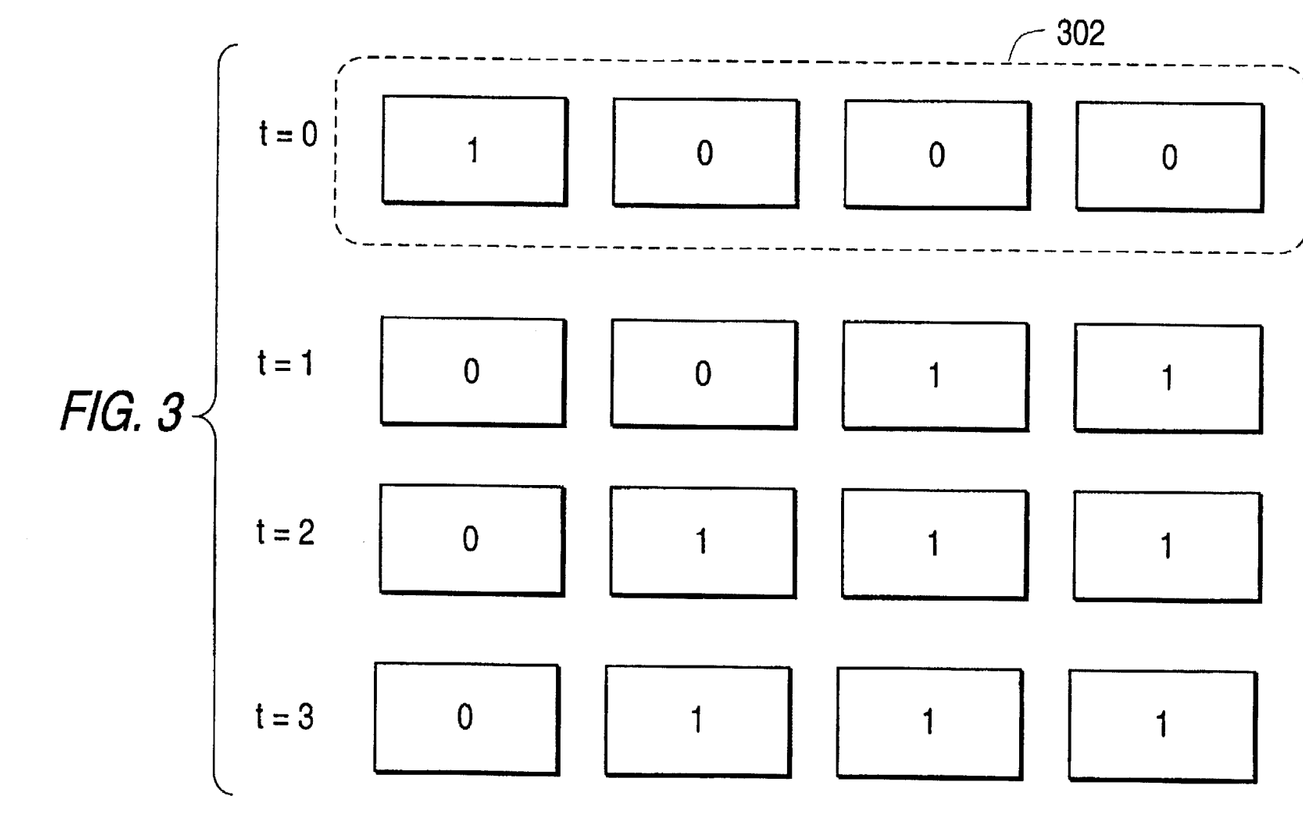
FIG. 3 shows the iteration of CA cell states at four time intervals.

FIG. 3 illustrates the evolution of cell states over four time intervals. In this example, a different rule, Wolfram rule 203, is applied to a two-state, three-site neighborhood in a four-cell lattice using cyclic boundary conditions. The first row represents the cell states in their initial configuration. The second, third, and fourth rows represent cell state values after the first, second, and third application of the CA Wolfram rule 203, respectively.

The preferred implementation of the present invention uses a CA transform to encrypt and decrypt data. This CA transform is specified in equation 3:

$$f_i = \sum_k c_k A_{ik} \tag{3}$$

The function f is defined in a physical space of lattice grid i using basis A and associated transform coefficients c. The variable k is an index that refers to the CA space of a lattice grid. The elements $A_{ik}$ of basis A are generated from the states of the CA cells $a_{ik}$. Each element $A_{ik}$ is generated according to specified characteristics described below.

Equation 3 represents a mapping of the function f (in the physical domain) into c (in the CA space) using the basis A to define the mapping. A strength of this invention is the huge number and varied nature of the bases that can be generated. The basis A comprises the building blocks used to construct the function f. The building blocks possess a plurality of shapes, which will be explained further below. The coefficients c measure the size of each basis required to reconstruct f. Thus, in equation (3), f represents, for example, data; c represents an encoded version of the same data (e.g., encrypted data); and basis A represents the function used to encode the data. The manner in which the present invention implements this transform will be explained in greater detail below.

CA TRANSFORM APPARATUS

Figure 4:
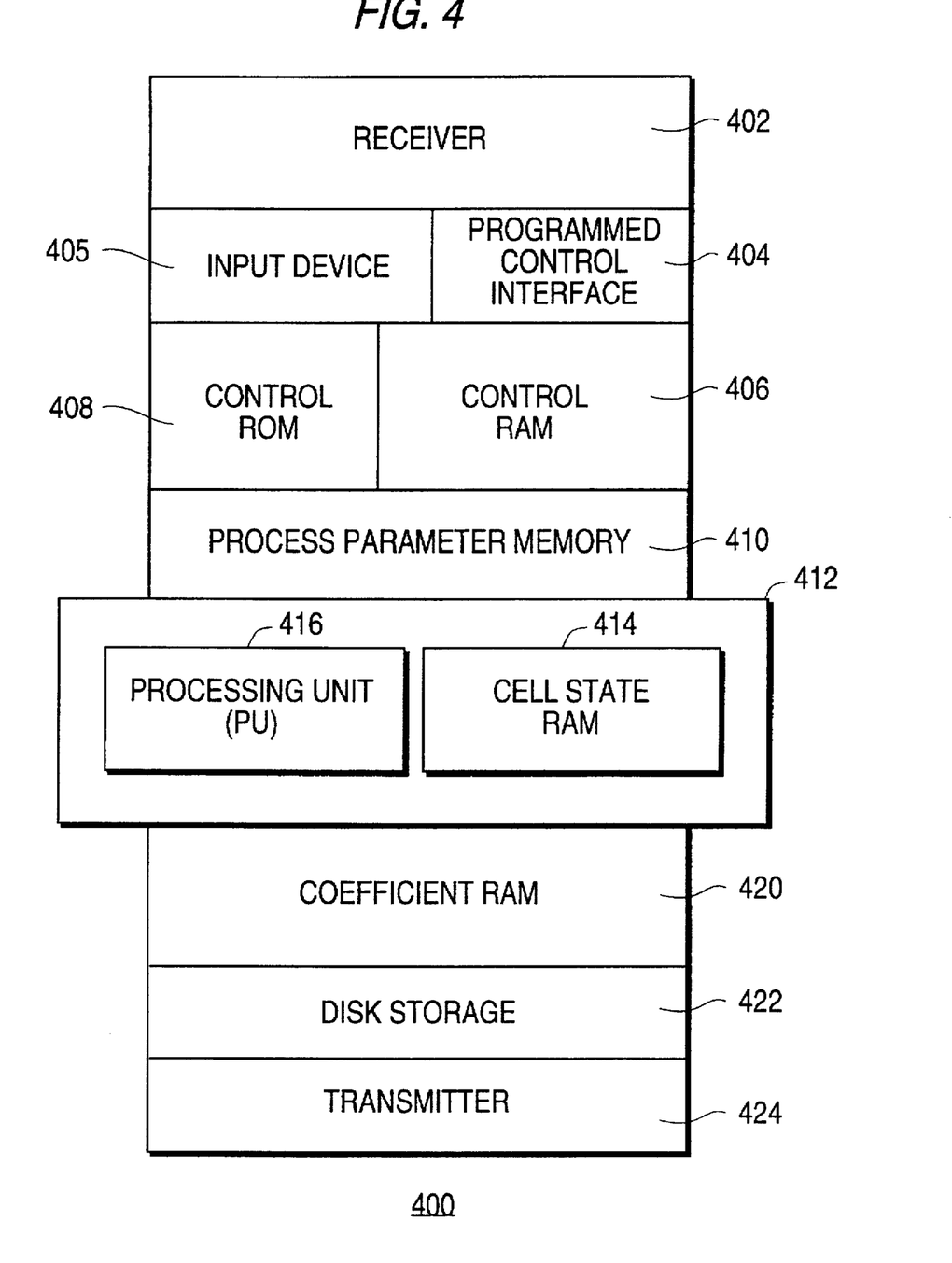
FIG. 4 is a block diagram of an apparatus for computing the CA transform according to the present invention.

FIG. 4 is a block diagram of a preferred CA transform apparatus 400 in which the CA transform represented by equation (3) may be implemented. Other apparatus types, for example, general purpose computers, may be used to implement the CA transform represented by equation (3).

Apparatus 400 is comprised of a receiver 402, an input device 405, a programmed control interface 404, control read only memory ("ROM") 408, control random access memory ("RAM") 406, process parameter memory 410, processing unit PU 416, cell state RAM 414, coefficient RAM 420, disk storage 422, and transmitter 424. Receiver 402 receives data from a transmitting data source for real-time (or batch) processing of information such as satellite imagery or encrypted transmissions. Alternatively, data awaiting processing by the present invention (e.g., archived images) are stored in disk storage 422.

The present invention performs information processing according to programmed control instructions stored in control ROM 408 and/or control RAM 406. Information processing steps that are not fully specified by instructions loaded into control ROM 408 may be dynamically specified by a user using an input device 405 such as a keyboard. In place of, or in order to supplement direct user control of programmed control instructions, a programmed control interface 404 provides a means to load additional instructions into control RAM 406. Process parameters received from input device 405 and programmed control interface 404 that are needed for the execution of the programmed control instructions are stored in process parameter memory 410. In addition, key values needed to compute a CA transform and any default process parameters can be preloaded into process parameter memory 410. Transmitter 424 provides a means to transmit the results of computations performed by the CA transform apparatus and process parameters used during computation.

The preferred apparatus 400 consists of at least one module 412 comprising a processing unit (PU) 418 and a cell state RAM 416. Module 412 is a physical manifestation of the CA cell. In an alternate embodiment more than one cell state RAM may share a PU.

The transform apparatus 400 shown in FIG. 4 can be readily implemented in parallel processing computer architectures. In a parallel processing implementation, processing units and cell state RAM pairs, or clusters of processing units and cell state RAMs, are distributed to individual processors in a distributed memory multiprocessor parallel architecture.

GENERAL DESCRIPTION OF PROCESS STEPS

Figure 5:
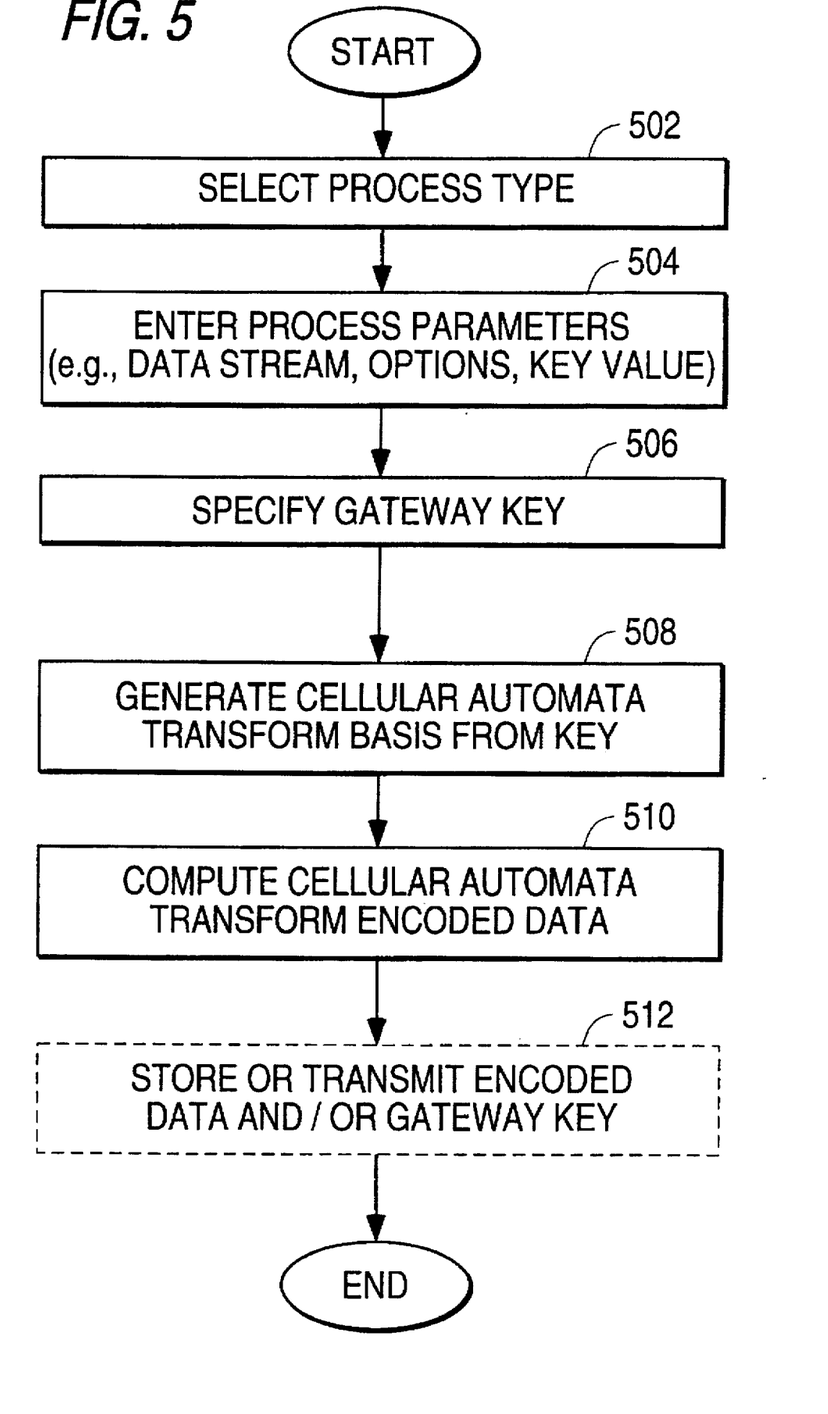
FIG. 5 is a flow diagram for CA encoding of data according to a preferred implementation of the present invention.

FIG. 5 is a flow diagram showing the steps common to performing information processing using the present invention. First, a process type is specified (step 502). The process type indicates the specific type of applications to which the present invention will be directed. It can be preprogrammed in control ROM 408, determined dynamically from user input via the user interface 404, or read from a software control program loaded into control RAM 406.

When performing one category of process types, the present invention transforms physical signals received by receiver 402 or stored in memory (disk storage 422). Encryption/decryption is one example of this category of process types.

Once a process type has been determined (step 502), the relevant process parameters are entered (step 504). The process parameters may vary for each process type. The process parameters, like the selection of the process type, can be preloaded or established dynamically.

For information processing applications, such as data encryption/decryption, relevant parameters are specified including the encoding error which will be zero for most cryptographic applications and the maximum time allowed for encoding.

A gateway key is specified either by a user or by choosing from among preloaded gateway key values stored in control memory (step 506). These gateway key values are described in detail below.

Using the specified gateway key (step 506), CA transform bases are generated (step 508). The computations required to generate the CA bases are performed by the PU 416. CA transform coefficients, in the form of encoded data, are computed by the PU 416 (step 510) as well.

Any computed CA transform coefficients may optionally be stored in memory 420 or transmitted via a transmitter 424 (step 512). The gateway key that was specified (step 506) and used to generate the CA transform basis (step 508) are also either stored in memory 410 or transmitted via transmitter 424.

CA TRANSFORM (GATEWAY) KEY

Figure 6:
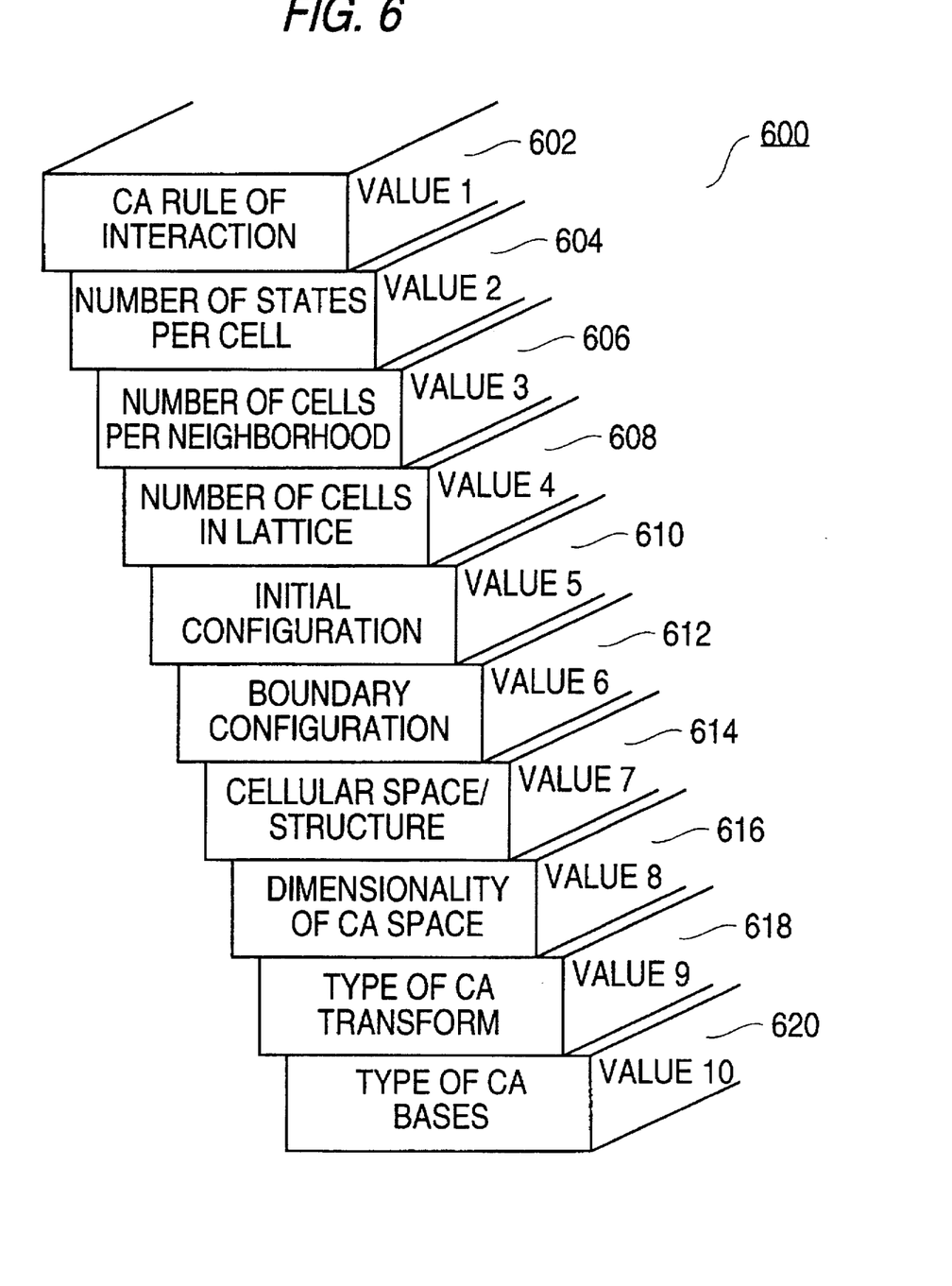
FIG. 6 is an illustration of a CA key and CA key values according to the present invention.

The preferred implementation uses a CA transform (gateway) key 600 consisting of a set of key values 602–620 illustrated FIG. 6. This key 600 contains the building blocks, or parameters, necessary to fully specify a CA transform for a particular information processing application. The key values 602–620 include:

Key value 1 (602) specifies a rule of interaction of the cells within a defined neighborhood, for example rule 90 (discussed above).

Key value 2 (604) specifies the number of states allowed for each cell. For example, a binary cell has two states.

Key value 3 (606) indicates the number of cells within each neighborhood. FIG. 1 illustrates several three-cell neighborhoods.

Key value 4 (608) defines the total number of cells in the entire lattice. FIG. 3 illustrates a four cell lattice.

Key value 5 (610) defines the initial configuration of the cells. The cell state initial configuration include, for example, the values of the four cells in lattice 302 of FIG. 3 at time interval zero (t=0).

Key value 6 (612) defines the boundary configuration of cells. For many applications, a cyclic boundary configuration yields the best results.

Key value 7 (614) specifies the geometric structure of the CA lattice. For example, CA lattice 302 has cells arrayed in a line segment.

Key value 8 (616) specifies the dimensionality of the CA lattice. CA lattice 302, for example, is a one-dimensional lattice.

Key value 9 (618) specifies the type of the CA transform. Representative types of CA transforms include standard orthogonal, progressive orthogonal, non-orthogonal, and self-generating transforms. Each of these transform types is discussed in detail below.

Key value 10 (620) specifies the CA basis type, also discussed in detail below.

The selection of the key values 602–620 governs the properties of the CA transform. In most applications of the present invention, some of the key values 602–620 will be fixed (e.g., key values 3, 4, and 7) for certain classes of information processing problems. One of ordinary skill in the art will be able to vary the key values to achieve optimum performance for a particular information processing application within an application class.

TYPES OF CA TRANSFORMS

Using the present invention to transform an input data sequence using a CA transform produces an encoded data sequence of CA transform coefficients. The techniques available for generating these transform coefficients are divided into two domains: orthogonal and nonorthogonal.

An orthogonal transform can be characterized by the way the coefficients are generated. A progressive orthogonal approach or the standard orthogonal method may be used. The progressive approach begins with computing the first coefficient using the entire input function. The error introduced by using this single coefficient to reconstruct the original function is then determined. Subsequently, the second coefficient is determined using the residual error as an input function. A new error is obtained when the two coefficients are used to reconstruct the original function. Next, the third coefficient is calculated using the new residual error. The process is continued until the residual error is zero for all the data points. If the transformation is truly of the orthogonal kind, there will be the same number of transform coefficients as there are data points by the time the residual error is equal to zero.

In the standard orthogonal method, the entire input function is used in determining all of the transform coefficients. The transformation error is zero if none of the coefficients is quantized, that is, none have been approximated, and every coefficient is used in the reconstruction of the input data. Orthogonal transformation permits the determination of transform coefficients without the need for elaborate and complex matrix inversion procedures.

Nonorthogonal transforms include the self-generating CA transform. The inherent similarity that exists in different parts of a given data sequence, self-similarity, can be exploited in a compact encoding of the data by using CA S-bases (discussed below). In certain instances it is possible, starting from an arbitrary or random function, to achieve an accurate reconstruction of the encoded data, via an iterative transformation called self-generation.

Self-generation may not be guaranteed regardless of the magnitude of the error allowed in the self-similar transformation of the data. The present invention embodies two types of self-generation: (1) strong self-generation and (2) weak self-generation. Strong self-generation is characterised by the ability to recover encoded data using a CA transform by application of an S-basis starting from an initial arbitrary sequence. Self-generation is weak when the recovery of the encoded data can only be achieved from a specified initial data set.

In CA transforms, the chief attraction of weak self-generation is the ease with which convergence during decoding can be guaranteed by the CA selection process in the encoding phase of the data processing. For applications requiring weak self-generation, only CA gateway values which ensure convergence to the given data, starting from a specific initial set are used. The initial set may be formed by simply assigning the same constant value for all data points.

TYPES OF CA BASES

A CA basis is characterized by one (or a combination) of the following features:
1. The method used in calculating the bases from the evolving CA lattice.
2. The orthogonality or non-orthognality of the basis.
3. The window size of the bases. Windows define regions in the basis where the values are non-zero. If the window size exceeds the number of cells in the lattice then the basis is non-windowed.
4. The method used in calculating the transform coefficients $c_k$.

Several basis classes may be used with the CA transform of the present invention. The first class of bases is referred to as the β-class. Elements in this class are comprised of the integers −1,1 for non-windowed and −1,0,1 for windowed.

Next is the ρ-bases whose elements are generated from the CA cell density of the evolving CA space. The CA cell density is the number of cells attaining a specified state or the number of times a given state has been attained by a specified cell. Therefore, ρ-bases always have integer values and are suitable for encryption and lossless data encoding.

A third class of bases, μ-bases, are generated from the CA cell density of the evolving CA space for multiple cells divided by a number corresponding to at least a subset of the total number of cells. The μ-bases have floating point elements.

S-bases, a fourth class, can be windowed or non-windowed. In a windowed S-basis a subset of the basis elements is set equal to zero. The transform coefficients consist of scaling parameters that connect segments of data with other segments of the same data.

Figure 7:
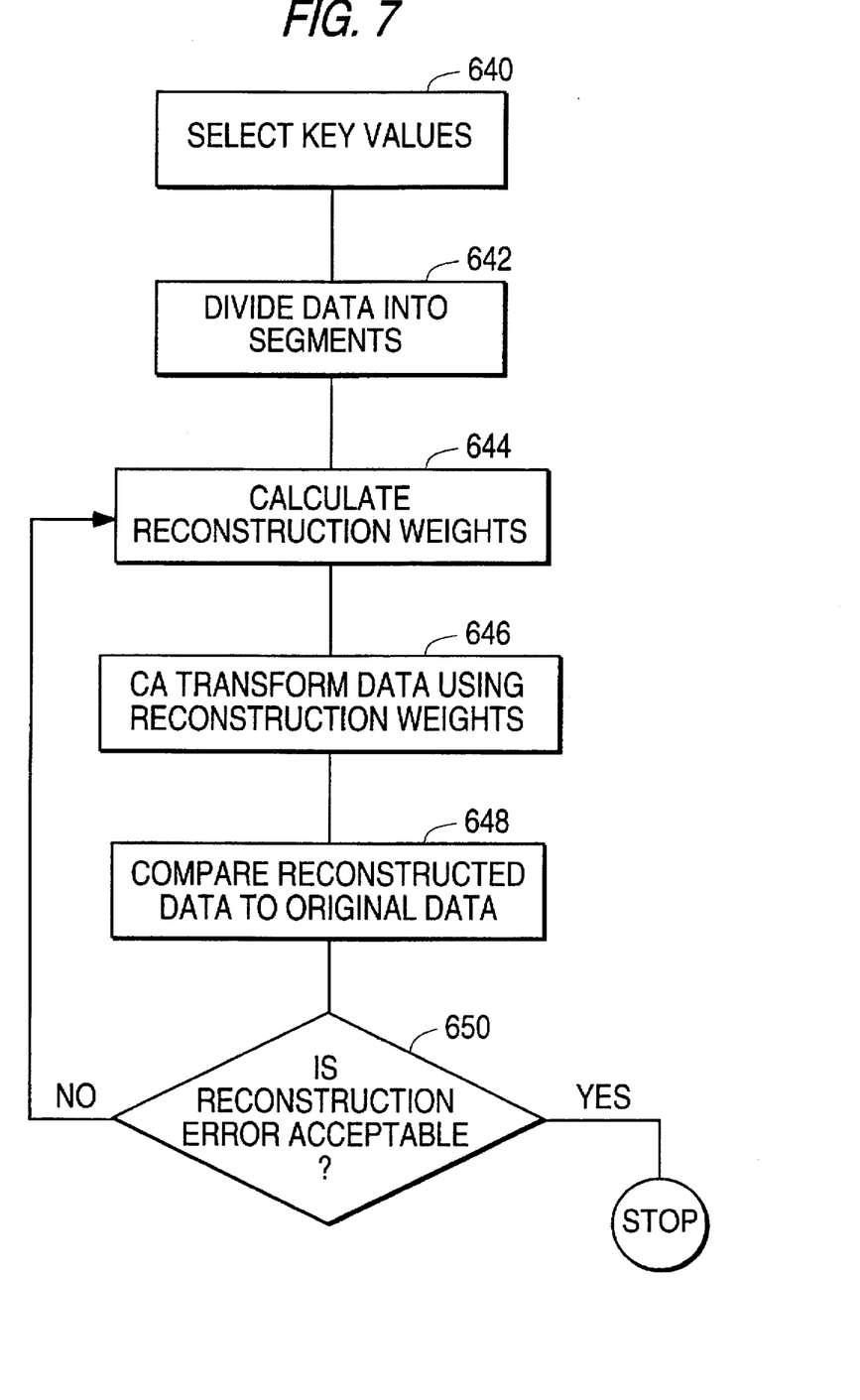
FIG. 7 is a flow chart showing the CA transform using an S-basis according to the present invention.

FIG. 7 is a flow diagram of the steps for computing an S-basis CA transform using the present invention. First, a set of CA key values are randomly selected (step 640). The input data is divided into segments (642). In general, the segments may overlap. The overlapping of segments will yield a greater fidelity in encoding at the expense of an increased number of parameters and increased encoding time. The next step is to calculate a set of weights such that using these weights, the value of a given reconstructed data point is a weighted sum of the entire data sequence (step 644). Starting with an initial data value, CA transform the data using an S-basis and the weights computed at step 646. Next, compare the reconstructed data sequence is compared with the original data sequence (step 648). The reason for reconstructing the data during the encoding process is to ensure the repeated application of the S-basis CA transform will actually converge to the original data. If the reconstruction error (the difference between the data sequence being encoded and the reconstructed data sequence that resulted from transformation) using the selected key is acceptable (step 650), then the computed weights comprise the S-basis; otherwise return to step 644 and calculate a new set of reconstruction weights. Repeat steps 646–650 until a gateway key producing a suitable reconstruction error has been found.

Figure 8:
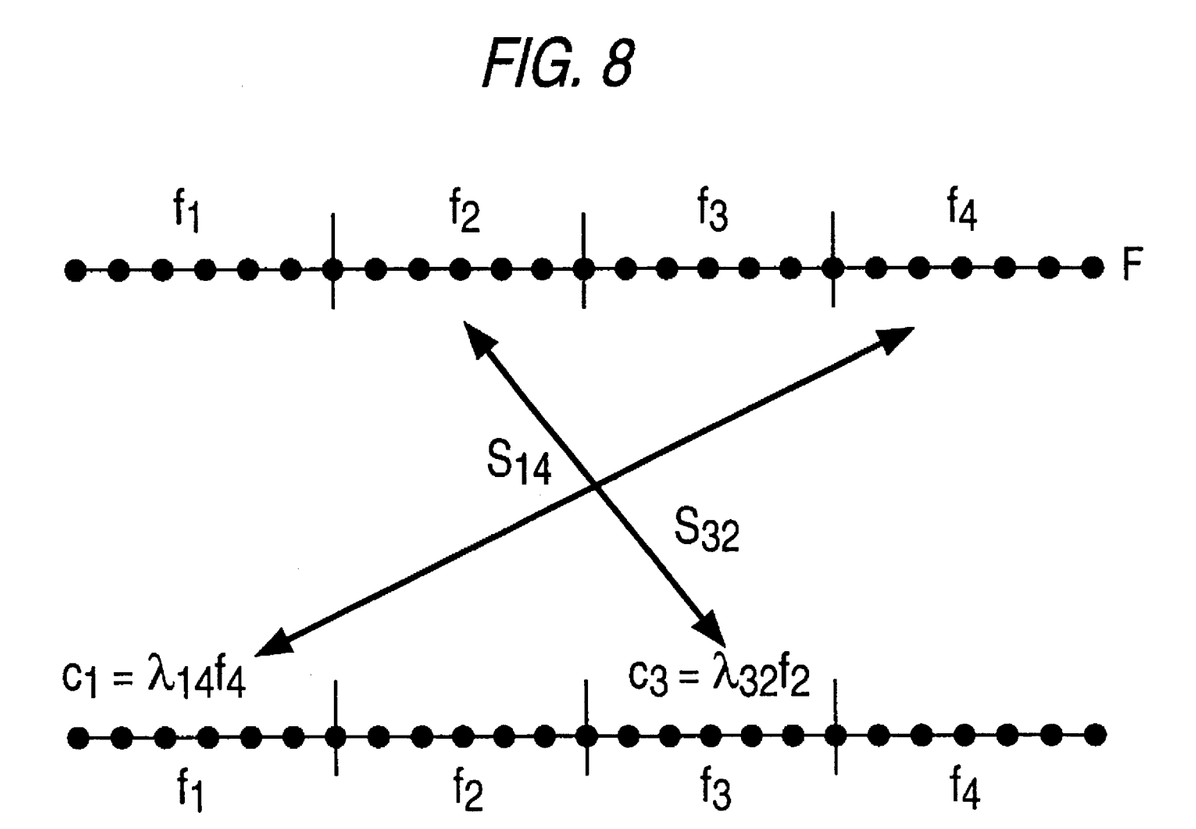
FIG. 8 is an illustration of a data string used to explain the S-bases according to the present invention.

Consider the data string, F, shown in the upper portion of the FIG. 8. This data string is subdivided, for example, into 4 equal segments labelled $f_1, f_2, f_3, f_4$. In the figure, the data segment $f_4$, is multiplied by a scaling parameter $\lambda_{14}$ that defines a mapping from segment $f_4$ to segment $f_1$, and the result is used as the transform coefficients for the segment $f_1$. The scaling parameter is calculated by minimizing the error involved in the S-basis CA transform using, for example, a least square error technique. The functions used to link every data point on the segment $f_1$ with each point of the scaled data segment $\lambda_{14} f_4$ are the S-bases. Similarly, the segment $f_3$ is generated from the scaled version of data in segment 2 (i.e., $\lambda_{32} f_2$). Once this association has been made, between different segments of the partitioned data, only the scaling parameters, and the keys used in generating the S-bases, need be stored or transmitted. The original data can be reproduced, with some error (whose magnitude depends on the degree of self-similarity and self-generation) by repeated application of the S-bases transformation to the various parts of the data.

There is an infinite number of ways by which the basis $A_{ik}$ can be expressed as a function of the CA cell states $a \equiv a_{i,t}$ ($i,t=0,1,2,\cdots N-1$). Examples of these are enumerated below for a dual-state CA. One of ordinary skill in the art will recognize that there are many more types of bases than the examples provided below.

Figure 9:
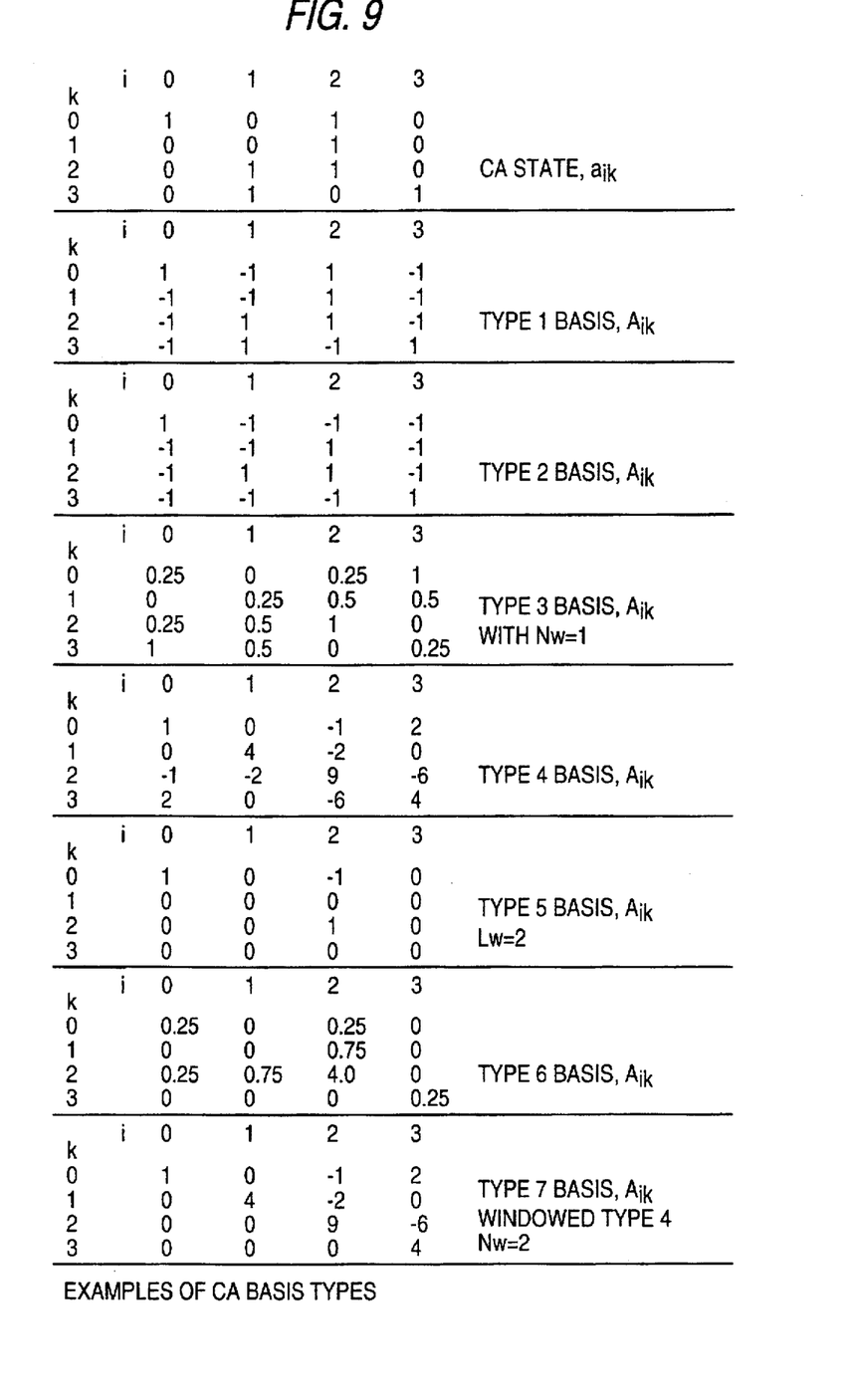
FIG. 9 illustrates examples of 7 basis types according to the present invention.

In several of the example basis types, there are variable parameters in some of the formulas for these bases. In such cases, there are multiple sub-bases, each with unique characteristics and capable of being used solely (or in groups) as transform bases. FIG. 9 illustrates examples of all 7 basis types given the CA state, $a_{ik}$.

A type 1 basis falls under the β class of CA bases. The CA state at cell i, at time k, is represented by $a_{ik}$. The value of the CA basis element $A_{ik}$ is 1 if the CA state of cell $a_{ik}$ is 1 (on), otherwise the corresponding CA basis element is −1, as explained in equation 4 where $a_{ik}$ is the state of the CA cell i at time t=k.

$$A_{ik}=2a_{ik}-1 \quad (4)$$

A type 2 basis is an example of a ρ class of CA bases. The correspondence between the value of a basis element and a cell state follows Table 1 below. For example, following equation 5 when cell $a_{ik}$ is 1 and cell $a_{ki}$ is 1, the basis element $A_{ik}$ is 1.

$$A_{ik}=(2a_{ik}-1)(2a_{ki}-1) \quad (5)$$

TABLE 1

CA basis element value for type 2 bases.

| CA state of $a_{ik}$ | CA state of $a_{ki}$ | Value of Basis Element $A_{ik}$ |
|---|---|---|
| 1 | 1 | 1 |
| 0 | 0 | 1 |
| 1 | 0 | -1 |
| 0 | 1 | -1 |

A type 3 basis is an example of a ∞ class of CA bases. In a type 3 basis the value of the basis element $A_{ik}$ corresponds to the average number of cells that have a value of 1 in a specified range of cells and may be represented by equation 6.

$$A_{ik}=\mu_{ik}\mu_{ki} \quad (6)$$

$$\mu_{ik} = \frac{1}{2n_w} \sum_{l=i-n_w}^{i+n_w} a_{l_w k}$$

$$l_w = \begin{cases} l & \text{if } 0 \leq l \leq N-1 \\ l+N & \text{if } l<0 \\ l-N & \text{if } l>N-1 \end{cases}$$

where $1 \leq n^w \leq N-2$.

This equation implies that there are (N-2) different ways of generating type 3 bases.

A type 4 basis are examples of the ρ class of CA bases. A type 4 basis element $A_{ik}$ is computed using equation 7 from the density a CA cell i, at time k, multiplied by the density of a CA cell k at time i.

$$A_{ik}=\rho_{ik}\rho_{ki} \quad (7)$$

where $\rho_{ik}=2a_{ik}-1+\rho_{ik-1}$ and $\rho_{i0}=2a_{ik}-1$

A type 5 basis element, like a type 4 basis, is the product of two cell densities; however, in a type 5 basis each cell density is modulated prior to multiplication. Modulation, in this sense, means periodically resetting the cell density value to zero once a threshold has been exceeded. Equation 8 explains the computation of type 5 basis elements:

$$A_{ik}=\rho_{ik}\rho_{ki} \quad (8)$$

where $\rho_{ik}=2a_{ik}-1+\rho_{ik-1} \mod L_w$ and $\rho_{i0}=2a_{ik}-1 \mod L_w$ in which $L_w \geq 2$ is an integer.

There are as many ways of generating a type 5 basis as are the selection of $L_w$.

A type 6 basis is another example of the p class of CA bases. In a type 6 basis the value of the basis element corresponds to the product of the average CA cell densities, as explained in equation 9.

$$A_{ik}=\mu_{ik}\mu_{ki} \quad (9)$$

where $\mu_{ik}=\mu_{ik-1}+a_{ik}/\sigma_k$ and $\mu_{i0}=a_{ik}/\sigma_k$

A type 7 basis is generated by windowing the result obtained in computing a basis element value using any of the foregoing six basis types. Thus, a type 7 basis may be a member of either the β, μ, or ρ class of CA bases. Setting basis element values to zero outside of a compact region of support is the windowing operation used to produce a type 7 basis. This is explained further below in equation 10:

$$A_{ik}=\delta_u A^*_{uk} \quad (10)$$

$$\delta_u = \begin{cases} 1 & \text{if } 0 \leq u < N_w \\ 0 & \text{otherwise} \end{cases}$$

u=i-k where A* is the basis obtained using the non-windowed types such as type 3 explained above. Type 7 bases are orthogonal for a large class of CA rules and initial/boundary configurations. Those skilled in art will recognize that there are many other types of bases including, for example, two-dimensional or multi-dimensional bases.

DATA ENCRYPTION

For certain kinds of data archival or data transmission purposes, the encoding error must be zero. One example is data encryption applications. CA transform bases which are capable of lossless encoding include both windowed and non-windowed β- and ρ-types. The transform coefficients have to be non-quantized integers, otherwise errors due to floating-point calculations may result during the decoding phase. In encryption applications, the focus is on data security. If a message is encoded using the present invention, a code breaker must contend with searching through different key values such as rules, initial configurations, boundary configurations, window sizes, and types of CA bases. The odds against code breakage increase tremendously as the number of states, cellular space, neighborhood, and dimensionality increase.

Figure 10:
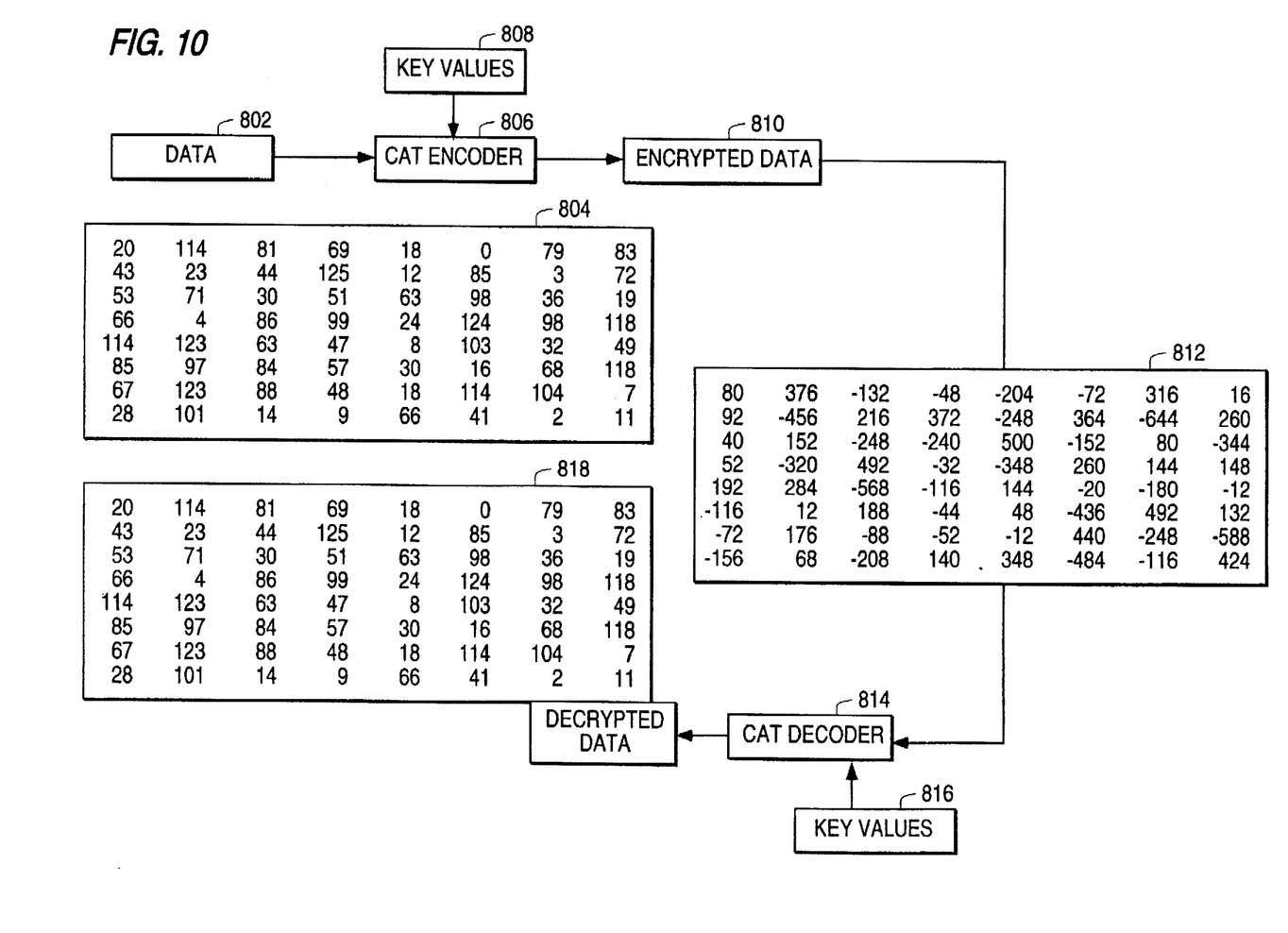
FIG. 10 is a block diagram showing data encryption and decryption using the CA transform according to a preferred implementation of the present invention.

An implementation of the present invention for CA transform based data encryption is illustrated in FIG. 10. Unencrypted data 802 shown in integer format 804 is fed into CAT encoder 806. A CA transform key 808 (including key value) is selected to generate encrypted data 810 shown in integer form 812. key values of key 808 used by the CAT encoder 806 to generate encrypted data 810 are provided in Table 2.

TABLE 2

Key values used for CAT data encryption shown in FIG. 10.

| Key Vallue Name | Key Value |
| --- | --- |
| CA Ruld of Interaction | 186 |
| Number of States Per Cell | 2 |
| Number of Cells Per Neighborhood | 3 |
| Number of Cells Per Lattice | 8 |
| Initiall Configuration | 11101010 |
| Bounda y Configuration | Cyclic |
| Cellular Space Structure | Line Segmbnt |
| Dimensi nonality of CA Space | 1D |
| Type of CA Transform | Progressive Orthogonal |
| Type of CA Basis | Type 7 (Type 3, with a window size and averaging length of 8 cells) |

The integer representation of the encrypted data 812 illustrates that without knowledge of the key values and CAT process used to encrypt the data, the relationship between the unencrypted data 804 and the encrypted data 812 would not be apparent to an unauthorized recipient.

To decrypt encrypted data 812 this encrypted data is fed into CAT decoder 814. Key 816 with identical key values to key 808 must be used by CAT decoder 814 to recover the original unencrypted data 818.

The present invention thus discloses efficient means to exploit the CA transform for data encryption/decryption.

Persons of ordinary skill will recognize that modifications and variations may be made to this invention without departing from the spirit and scope of the general inventive concept. This invention in its broader aspects is therefore not limited to the specific details or representative methods shown as described.

I claim:

1. A method of encrypting data using a transform which is a function of input data and a basis, the method comprising the steps performed by a computer of:

a. receiving the input data;

b. generating the basis from key values specifying characteristics of a cellular automata space of at least one cell and at least one rule of interaction for the at least one cell; and c. transforming the input data into encrypted data using the basis.

2. The method of claim 1 wherein the transforming step includes a substep of:

transmitting the encrypted data to a receiver.

3. The method of claim 1 wherein the generating step includes a substep of:

evolving the at least one cell using the key values and the at least one rule of interaction.

4. The method of claim 3 wherein the generated basis is one of a plurality of classes of bases, each class having a basis type and defining an element value.

5. The method of claim 4 wherein the element value for a first class of the plurality of classes of bases is one, zero, or negative one.

6. The method of claim 4 wherein the element value is a weighted sum of values in selected ones of the cells during intervals of said evolution.

7. The method of claim 4 wherein the element value is an average of the cells having a selected value.

8. The method of claim 4 wherein the element value is computed following the steps of:

selecting the key value;

dividing the input data into segments;

calculating reconstruction weights, wherein an element of said input data is determined using the reconstruction weights from other elements of said input data;

transforming an initial data value into reconstructed data using the reconstruction weights; and comparing said reconstructed data to the input data.

9. The method of claim 1 wherein the input data is a digital image.

10. The method of claim 1 further comprising the step of storing the key values in memory.

11. The method of claim 1 further comprising the step of transmitting the key values to a receiver.

12. A method of decrypting data using a transform which is a function of input data and a basis, the method comprising the steps performed by a computer of:

a. receiving the input data;

b. generating the basis from key values specifying characteristics of at least one cell and at least one rule of interaction of the at least one cell; and c. transforming the input data into decrypted data using the basis.

13. The method of claim 12 wherein the transforming step includes a substep of:

storing the decrypted data.

14. The method of claim 12 wherein the generating step includes a substep of:

evolving the at least one cell using the key values and the at least one rule of interaction.

15. The method of claim 14 wherein the generated basis is one of a plurality of classes of bases, each class having a basis type and defining an element value.

16. The method of claim 15 where the element value for a first class of the plurality of classes of bases is one, zero, or negative one.

17. The method of claim 15 wherein the element value is a weighted sum of values in selected ones of the cells during intervals of said evolution.

18. The method of claim 17 wherein said input data is a digital image.

19. The method of claim 15 wherein the element value is computed following the steps of:

selecting the key value;

dividing the input data into segments;

calculating reconstruction weights, wherein an element of said input data is determined using said reconstruction weights from other elements of said input data;

transforming an initial data value into reconstructed data using said reconstruction weights; and comparing said reconstructed data to said input data.

20. The method of claim 15 wherein the element value is an average of the cells having a selected value.

21. The method of claim 14 further comprising the step of storing said key values in memory.

22. The method of claim 14 further comprising the step of transmitting said key values to a receiver.

23. An apparatus for encrypting or decrypting data using a transform which is a function of input data and a basis, the apparatus comprising:

a. a receiver receiving the input data;

b. a processing module, connected to the receiver, generating the basis from key values specifying characteristics of at least one cell and at least one rule of interaction of the at least one cell; and c. said processing module transforming the input data into encrypted or decrypted data using the basis.

\* \* \* \* \*

UNITED STATES PATENT AND TRADEMARK OFFICE
CERTIFICATE OF CORRECTION

PATENT NO. : 5,677,956
DATED : October 14, 1997
INVENTOR(S) : Olurinde E. Lafe

It is certified that error appears in the above-indentified patent and that said Letters Patent is hereby corrected as shown below:

Title Page, col. 1, at item [76], line 1, change "[76]" to --[75]--, and delete "P.O. Box 700"; line 2, delete "44026";

below item [76], insert the following:

--[73] Assignee: Innovative Computing Group, Chesterland, Ohio--.

Signed and Sealed this

Fourteenth Day of April, 1998

Attest:

BRUCE LEHMAN

Attesting Officer     *Commissioner of Patents and Trademarks*